United States Patent
Rohrbach

(10) Patent No.: US 10,913,828 B2
(45) Date of Patent: Feb. 9, 2021

(54) PREPARATION OF POLYMER COMPOSITIONS CONTAINING PHOSPHATES

(71) Applicant: Rohm and Haas Company, Collegeville, PA (US)

(72) Inventor: William Rohrbach, Perkasie, PA (US)

(73) Assignee: Rohm and Haas Company, Philadelphia, PA (US)

( * ) Notice: Subject to any disclaimer, the term of this patent is extended or adjusted under 35 U.S.C. 154(b) by 137 days.

(21) Appl. No.: 16/319,941

(22) PCT Filed: Sep. 8, 2017

(86) PCT No.: PCT/US2017/050638
§ 371 (c)(1),
(2) Date: Jan. 23, 2019

(87) PCT Pub. No.: WO2018/057313
PCT Pub. Date: Mar. 29, 2018

(65) Prior Publication Data
US 2020/0181336 A1    Jun. 11, 2020

Related U.S. Application Data

(60) Provisional application No. 62/398,283, filed on Sep. 22, 2016.

(51) Int. Cl.
| | |
|---|---|
| *C08J 3/16* | (2006.01) |
| *C08F 236/10* | (2006.01) |
| *C08J 3/20* | (2006.01) |
| *C08K 3/32* | (2006.01) |
| *C08L 9/08* | (2006.01) |
| *C08J 3/205* | (2006.01) |

(52) U.S. Cl.
CPC .............. *C08J 3/16* (2013.01); *C08F 236/10* (2013.01); *C08J 3/2053* (2013.01); *C08K 3/32* (2013.01); *C08L 9/08* (2013.01); *C08F 2800/20* (2013.01); *C08J 2309/08* (2013.01); *C08K 2003/324* (2013.01); *C08L 2201/08* (2013.01)

(58) Field of Classification Search
CPC ..... C08J 3/16; C08J 3/2053; C08J 3/32; C08J 2309/08; C08F 236/10; C08F 2800/20; C08K 3/32; C08K 2003/324
USPC ......................................................... 524/414
See application file for complete search history.

(56) References Cited

U.S. PATENT DOCUMENTS

| | | | |
|---|---|---|---|
| 6,545,089 | B1 | 4/2003 | DeRudder et al. |
| 8,008,327 | B2 | 8/2011 | DiSalvo et al. |
| 8,008,372 | B2 * | 8/2011 | Rohrbach ............. C08F 265/04 523/335 |
| 8,008,373 | B2 | 8/2011 | Narayan et al. |
| 9,068,036 | B2 | 6/2015 | Navarro et al. |
| 9,260,604 | B2 | 2/2016 | Vilasagar et al. |
| 2010/0130643 | A1 * | 5/2010 | Rohrbach ............. C08F 257/02 523/335 |
| 2015/0065651 | A1 | 3/2015 | Takamido et al. |
| 2017/0355801 | A1 * | 12/2017 | Couffin ..................... C08F 6/22 |

FOREIGN PATENT DOCUMENTS

| | | | | |
|---|---|---|---|---|
| EP | 2189497 | A1 * | 5/2010 | ............. C08F 265/04 |
| EP | 2189497 | A1 | 5/2010 | |
| EP | 2465884 | A1 | 6/2012 | |
| JP | 2006249198 | A | 9/2006 | |
| JP | 2010150301 | A | 7/2010 | |
| WO | WO-2016083396 | A1 * | 6/2016 | ............. C08F 279/02 |

* cited by examiner

*Primary Examiner* — Michael Bernshteyn
(74) *Attorney, Agent, or Firm* — Brian L. Mutschler

(57) ABSTRACT

Provided are processes for making a polymer composition comprising (i) providing a multistage polymer latex by emulsion polymerization in the presence of a phosphate surfactant, wherein the multistage polymer comprises (a) a first stage polymer having a $T_g$ of −20° C. or lower, and (b) a final stage polymer having a $T_g$ of 50° C. or higher, (ii) coagulating the multistage polymer latex, (iii) treating the coagulated multistage polymer with an alkaline phosphate, (iv) drying the coagulated multistage polymer to a water content of less than 1 weight % based on the dry weight of the multistage polymer, wherein the weight of the dried multistage polymer comprises 100 ppm or more, based on the dry weight of the multistage polymer, of phosphorous that is in the form of an alkaline phosphate. Also provided are processes for making matrix resin compositions comprising such polymer compositions and a matrix resin.

10 Claims, No Drawings

PREPARATION OF POLYMER COMPOSITIONS CONTAINING PHOSPHATES

FIELD OF THE INVENTION

This invention relates generally to processes for making multistage polymer compositions that are useful as impact modifiers. The compositions contain polymers having a first having a $T_g$ of 0° C. or lower and a subsequent stage having a $T_g$ of 20° C. or higher, one or more phosphate surfactant, and one or more alkaline phosphate.

BACKGROUND

Coagulation of a polymer latex is one of separating the polymer of the latex from the water of the latex. Coagulation processes, however, have the disadvantage of introducing multivalent cations and other ionic impurities into the solid polymer, which can be a drawback, for example, if the polymer composition is used as an additive in a matrix resin upon which multivalent cations and other ionic impurities are known to have deleterious effects.

Various solutions dealing with excess multivalent cations have been proposed in the art. For example, U.S. Pat. No. 8,008,372 discloses post-addition of an aqueous solution of an alkaline phosphate to insolubilize residual phosphate salts of multivalent cations. Such insoluble calcium phosphate, for example, is left behind on the surface of the polymer. The prior art does not, however, disclose a process according to the present invention, which achieves improved heat stability of mixtures of impact modifier polymer compositions combined with matrix resins.

Accordingly, there is a need to develop new processes and impact modifier polymer compositions that do not suffer from the drawbacks of the prior art, namely, mixtures of impact modifier polymer compositions and matrix resins that provide significant improvements in heat stability of the mixture.

STATEMENT OF INVENTION

One aspect of the invention provides a process for making a polymer composition comprising (i) providing a multistage polymer latex by emulsion polymerization in the presence of a phosphate surfactant, wherein the multistage polymer comprises (a) a first stage polymer having a $T_g$ of −20° C. or lower, and (b) a final stage polymer having a $T_g$ of 50° C. or higher, (ii) coagulating the multistage polymer latex, (iii) treating the coagulated multistage polymer with an alkaline phosphate, (iv) drying the coagulated multistage polymer to a water content of less than 1 weight % based on the dry weight of the multistage polymer, wherein the weight of the dried multistage polymer comprises 100 ppm or more, based on the dry weight of the multistage polymer, of phosphorous that is in the form of an alkaline phosphate.

In another aspect, the invention provides a process for making a matrix composition comprising mixing (A) one or more matrix resins, and (B) a polymer composition prepared by (i) providing a multistage polymer latex by emulsion polymerization in the presence of a phosphate surfactant, wherein the multistage polymer comprises (a) a first stage polymer having a $T_g$ of −20° C. or lower, and (b) a final stage polymer having a $T_g$ of 50° C. or higher, (ii) coagulating the multistage polymer latex, (iii) treating the coagulated multistage polymer with an alkaline phosphate, (iv) drying the coagulated multistage polymer to a water content of less than 1 weight % based on the dry weight of the multistage polymer, wherein the weight of the dried multistage polymer comprises 100 ppm or more, based on the dry weight of the multistage polymer, of phosphorous that is in the form of an alkaline phosphate.

DETAILED DESCRIPTION

The inventors have now surprisingly found that impact modifier polymer compositions containing multi-stage polymers that are made by aqueous emulsion polymerization in the presence of a phosphate soap, followed by the post-coagulation addition of an alkaline phosphate, provides improved heat stability to mixtures of such polymer compositions combined with matrix resins.

As used herein, the term "polymer" refers to a polymeric compound prepared by polymerizing monomers, whether of the same or a different type. The generic term "polymer" includes the terms "homopolymer," "copolymer," "terpolymer," and "resin." As used herein, the term "polymerized units derived from" refers to polymer molecules that are synthesized according to polymerization techniques wherein a product polymer contains "polymerized units derived from" the constituent monomers which are the starting materials for the polymerization reactions. As used herein, the term "(meth)acrylate" refers to either acrylate or methacrylate or combinations thereof, and the term "(meth) acrylic" refers to either acrylic or methacrylic or combinations thereof. As used herein, the term "substituted" refers to having at least one attached chemical group, for example, alkyl group, alkenyl group, vinyl group, hydroxyl group, carboxylic acid group, other functional groups, and combinations thereof.

As used herein, the term "phosphate" refers to an anion that is made up of phosphorous and oxygen atoms. Included are orthophosphate ($PO_4^{-3}$), the polyphosphates ($P_nO_{3n+1}^{-(n+2)}$ where n is 2 or larger), and the metaphosphates (circular anions with the formula $P_mO_{3m}^{-m}$ where m is 2 or larger). As used herein, an "alkaline phosphate" refers to a salt of an alkali metal cation with a phosphate anion. Alkaline phosphates include alkali metal orthophosphates, alkali metal polyphosphates, and alkali metal metaphosphates. Alkaline phosphates also include partially neutralized salts of phosphate acids, including, for example, partially neutralized salts of orthophosphoric acid such as, for example, monosodium dihydrogen phosphate and disodium hydrogen phosphate.

As used herein, the term "multistage polymer" refers to a polymer that is made by forming (i.e., polymerizing) a first polymer, called the "first stage" or the "first stage polymer," and then, in the presence of the first stage, forming a second polymer called the "second stage" or "second stage polymer," which can be an intermediate stage of final stage. A multistage polymer has at least a first stage, optional intermediate stages, and a final stage. Each intermediate stage is formed in the presence of the polymer resulting from the polymerization of the stage immediately previous to that intermediate stage. In such embodiments wherein each subsequent stage forms a partial or complete shell around each of the particles remaining from the previous stage, the multistage polymer that results is known as a "core/shell" polymer.

As used herein, the term "weight average molecular weight" or "$M_w$" refers to the weight average molecular weight of a polymer as measured by gel permeation chromatography ("GPC"), for acrylic polymers against polystyrene calibration standards following ASTM D5296-11

(2011), and using tetrahydrofuran ("THF") as the mobile phase and diluent. As used herein, the term "weight of polymer" means the dry weight of the polymer.

As used herein, the terms "glass transition temperature" or "$T_g$" refers to the temperature at or above which a glassy polymer will undergo segmental motion of the polymer chain. Glass transition temperatures of a copolymer can be estimated by the Fox equation (*Bulletin of the American Physical Society*, 1 (3) Page 123 (1956)) as follows:

$$1/T_g = w_1/T_{g(1)} + w_2/T_{g(2)}$$

For a copolymer, $w_1$ and $w_2$ refer to the weight fraction of the two comonomers, and $T_{g(1)}$ and $T_{g(2)}$ refer to the glass transition temperatures of the two corresponding homopolymers made from the monomers. For polymers containing three or more monomers, additional terms are added ($w_n/T_{g(n)}$). The glass transition temperatures of the homopolymers may be found, for example, in the "Polymer Handbook," edited by J. Brandrup and E. H. Immergut, Interscience Publishers. The $T_g$ of a polymer can also be measured by various techniques, including, for example, differential scanning calorimetry ("DSC"). As used herein, the phrase "calculated $T_g$" shall mean the glass transition temperature as calculated by the Fox equation. When the $T_g$ of a multistage polymer is measured, more than one $T_g$ may be observed. The $T_g$ observed for one stage of a multistage polymer may be the same as the $T_g$ that is characteristic of the polymer that forms that stage (i.e., the $T_g$ that would be observed if the polymer that forms that stage were formed and measured in isolation from the other stages). When a monomer is said to have a certain $T_g$, it is meant that a homopolymer made from that monomer has that $T_g$.

A compound is considered "water-soluble" herein if the amount of that compound that can be dissolved in water at 20° C. is 5 g or more of compound per 100 ml of water. A compound is considered "water-insoluble" herein if the amount of that compound that can be dissolved in water at 20° C. is 0.5 g or less of compound per 100 ml of water. If the amount of a compound that can be dissolved in water at 20° C. is between 0.5 g and 5 g per 100 ml of water, that compound is said herein to be "partially water-soluble."

As used herein, when it is stated that "the polymer composition contains little or no" of a certain substance, it is meant that the polymer composition contains none of that substance, or, if any of that substance is present in the present composition, the amount of that substance is 1% or less by weight, based on the weight of the polymer composition. Among embodiments that are described herein as having "little or no" of a certain substance, embodiments are envisioned in which there is none of that certain substance.

The polymer composition of the present invention contains a multistage polymer made by aqueous emulsion polymerization. In aqueous emulsion polymerization, water forms the continuous medium in which polymerization takes place. The water may or may not be mixed with one or more additional compounds that are miscible with water or that are dissolved in the water. In some embodiments, the continuous medium contains 30 weight % or more water, or 50 weight % or more water, or 75 weight % or more water, or 90 weight % or more water, based on the weight of the continuous medium.

Emulsion polymerization involves the presence of one or more initiator. An initiator is a compound that forms one or more free radical, which can initiate a polymerization process. The initiator is usually water-soluble. Some suitable initiators form one or more free radical when heated. Some suitable initiators are oxidants and form one or more free radical when mixed with one or more reductant, or when heated, or a combination thereof. Some suitable initiators form one or more free radical when exposed to radiation such as, for example, ultraviolet radiation or electron beam radiation. A combination of suitable initiators is also suitable.

In certain embodiments, the multistage polymer is made by emulsion polymerization to form a latex. In such embodiments, the latex has a mean particle size of 50 nm or higher, or 100 nm or higher. In certain embodiments, the latex has a mean particle size of less than 1 micrometer, or less than 800 nm, or less than 600 nm.

The emulsion polymerization involves the use of one or more surfactant comprising an anionic phosphate surfactant. Each anionic phosphate surfactant has a cation associated with it forming an alkaline metal salt of the phosphate surfactant including, for example, alkyl phosphate salts and alkyl aryl phosphate salts. Suitable cations include, for example, ammonium, cation of an alkali metal, and mixtures thereof. Suitable alkaline metal salts of the phosphate surfactant include, for example, polyoxyalkylene alkyl phenyl ether phosphate salt, polyoxyalkylene alkyl ether phosphate salt, polyoxyethylene alkyl phenyl ether phosphate salt, and polyoxyethylene alkyl ether phosphate salt. In certain embodiments, the alkaline metal salt of the phosphate surfactant comprises a polyoxyethylene alkyl ether phosphate salt. In certain embodiments, the weight of the phosphate surfactant present in emulsion polymerization of the multistage polymer is 0.5 weight % or more, preferably 1.0 weight % or more, and more preferably 1.5 weight % or more, as characterized by weight of phosphate surfactant based on the total monomer weight added to the polymerization. In certain embodiments, the weight of the phosphate surfactant present in emulsion polymerization of the multistage polymer is 5 weight % or less, preferably 4 weight % or less, and more preferably 3 weight % or less, as characterized by weight of phosphate surfactant based on the total monomer weight added to the polymerization. In certain embodiments, one or more anionic surfactants in addition to the anionic phosphate surfactant described above is utilized in the emulsion polymerization. Suitable additional anionic surfactants include, for example, carboxylates, sulfosuccinates, sulfonates, and sulfates.

In certain embodiments, the multistage polymer is made by emulsion polymerization to form a latex. As used herein, the term "latex" refers to the physical form of a polymer in which the polymer is present in the form of small polymer particles that are dispersed in water. In certain embodiments, the latex has a mean particle size of 50 nm or greater or 100 nm or greater. In certain embodiments, the latex has a mean particle size of 1,000 nm or less, or 800 nm or less, or 600 nm or less.

The multistage polymer of the present invention contains a first stage polymer containing polymerized units derived from one or more substituted or unsubstituted dienes, one or more substituted or unsubstituted styrene, one or more substituted or unsubstituted (meth)acrylate monomers, (meth)acrylic acid, or mixtures thereof. In certain embodiments, the first stage polymer has a $T_g$ of $-20°$ C. or less, or $-35°$ C. or less, or $-50°$ C. or less. In certain embodiments, the first stage polymer has a $T_g$ of $-150°$ C. or more, or $-100°$ C. or more. In certain embodiments, the multistage polymer contains the first stage polymer in an amount of 10 weight % or more, or 20 weight % or more, or 50 weight % or more, based on the total weight of the multistage polymer. In certain embodiments, the multistage polymer contains the first stage polymer in an amount of 98 weight % or less, or 95 weight % or less, or 90 weight % or less, based on the total weight of the multistage polymer.

In certain embodiments, the first stage contains polymerized units or one or more (meth)acrylate monomers that has a $T_g$ of 0° C. or lower. Suitable (meth)acrylate monomers include, for example, ethyl acrylate, butyl acrylate, and 2-ethylhexyl acrylate. In certain embodiments, the first stage contains polymerized units derived from (meth)acrylate monomers having a $T_g$ of 0° C. or lower in an amount of 50 weight % or higher, or 75 weight % or higher, or 90 weight % or higher, based on the total weight of the first stage polymer.

In certain embodiments, the first stage of the multistage polymer contains polymerized units derived from one or more multifunctional monomers. Multifunctional monomers contain two or more functional groups that are capable of participating in a polymerization reaction. Suitable multifunctional monomers include, for example, divinylbenzene, allyl methacrylate, ethylene glycol methacrylate, and 1,3-butylene dimethacrylate. In certain embodiments, the first stage contains polymerized units derived from a multifunctional monomer in an amount of 0.01 weight % or more, or 0.03 weight % or more, or 0.1 weight % or more, based on the weight of the total weight of the first stage polymer. In certain embodiments, the first stage contains polymerized units derived from a multifunctional monomer in an amount of 5 weight % or less, or 2 weight % or less, based on the weight of the total weight of the first stage polymer.

In certain embodiments, the first stage of the multistage polymer contains polymerized units derived from one or more diene monomers. Suitable diene monomers include, for example, butadiene and isoprene. In certain embodiments, the first stage contains polymerized units derived from diene monomers in an amount of 2 weight % or more, or 5 weight % or more, or 10 weight % or more, or 20 weight % or more, or 50 weight % or more, or 75 weight % or more, based on the total weight of the first stage polymer. In certain embodiments, the first stage contains polymerized units derived from diene monomers in an amount of 100 weight % or less, or 98 weight % or less, or 90 weight % or less, based on the total weight of the first stage polymer.

In certain embodiments, the first stage of the multistage polymer contains polymerized units derived from one or more of styrene, substituted styrene, or mixtures thereof. Suitable substituted sytrenes include, for example, alpha-alkyl styrenes (e.g., alpha-methyl styrene). In certain embodiments, the first stage contains polymerized units derived from one or more of styrene and substituted styrene in an amount of 1 weight % or more, or 2 weight % or more, or 5 weight % or more, or 10 weight % or more, based on the total weight of the first stage polymer. In certain embodiments, the first stage contains polymerized units derived from one or more of styrene and substituted styrene in an amount of 80 weight % or less, or 50 weight % or less, or 25 weight % or less, or 10 weight % or less, or 5 weight % or less, based on the total weight of the first stage polymer.

In certain embodiments, the first stage polymer of the multistage polymer contains polymerized units derived from acid-functional monomers. An acid-functional monomer is a monomer that has an acid group, for example, a sulfonic acid group or a carboxylic acid group. Suitable acid-functional monomers include, for example, acrylic acid and methacrylic acid. In certain embodiments, the first stage contains polymerized units derived from one or more acid functional monomers in an amount of 3 weight % or less, or 2 weight % or less, or 1 weight % or less, or 0.5 weight % or less, based on the total weight of the first stage polymer.

The multistage polymer of the present invention contains a final stage polymer containing polymerized units derived from one or more substituted or unsubstituted styrene, one or more substituted or unsubstituted (meth)acrylate monomers, (meth)acrylic acid, or mixtures thereof. In certain embodiments, the final stage polymer has a $T_g$ of 50° C. or more, or 90° C. or more. In certain embodiments, the final stage polymer has a $T_g$ of 200° C. or less, or 150° C. or less. In certain embodiments, the multistage polymer contains the final stage polymer in an amount of 2 weight % or more, or 10 weight % or more, or 20 weight % or more, based on the total weight of the multistage polymer. In certain embodiments, the multistage polymer contains the final stage polymer in an amount of 50 weight % or less, or 25 weight % or less, or 10 weight % or less, based on the total weight of the multistage polymer. Suitable monomers in the final stage include, for example, one or more of styrene, alpha-methyl styrene, methyl methacrylate, and butyl acrylate. In certain embodiments, the final stage polymer contains polymerized units derived from monomers having a $T_g$ of 50° C. or higher in an amount of 50 weight % or higher, or 75 weight % or higher, or 90 weight % or higher, or 100 weight % or higher, based on the total weight of the final stage polymer.

In certain embodiments, the weight ratio of the first stage polymer to the final stage polymer is 0.1:1 or higher, or 0.2:1 or higher, or 0.4:1 or higher, or 1:1 or higher, or 1.5:1 or higher, or 3:1 or higher, or 4:1 or higher. In certain embodiments, the weight ratio of the first stage polymer to the final stage polymer is 50:1 or lower, or 25:1 or lower, or 20:1 or lower.

In certain embodiments, the multistage polymer contains one or more intermediate stage polymers. In certain embodiments, the total sum of the intermediate stage polymers are present in an amount of 1 weight % or more, or 2 weight % or more, or 5 weight % or more, or 10 weight % or more, based on the total weight of the multistage polymer. In certain embodiments, the total sum of the intermediate stage polymers are present in an amount of 60 weight % or less, or 2 weight % or less, or 5 weight % or less, or 10 weight % or less, based on the total weight of the multistage polymer.

In the process of the present invention, the multistage polymer latex is coagulated. Methods of coagulating latex polymers are known in the art. The coagulation is carried out in order to convert the multistage polymer from a latex to a solid form such as pellets or powder. Suitable methods include, for example, addition of multivalent cations, addition of acids, addition of salts to increase ionic strength, and the use of high temperature and high agitation.

In certain embodiments, the multistage polymer is coagulated by mixing the multistage polymer with one or more multivalent cation. In such embodiments, the composition of the present invention contains one or more phosphate salt of a multivalent cation that is created by the post-addition of an excess of alkaline phosphate discussed below. Suitable multivalent cations include, for example, multivalent metal cations and alkaline earth cations. Suitable multivalent cations include, for example, aluminum (+3), calcium (+2), cobalt (+2), copper (+2), iron (+2), magnesium (+2), zinc (+2), and mixtures thereof. In certain embodiments, calcium (+2), and magnesium (+2). In certain embodiments, every multivalent cation that is present is calcium (+2), or magnesium (+2), or a mixture thereof. In certain embodiments, the multivalent cation is present in an amount of 10 ppm or more, or 30 ppm or more, or 100 ppm or more, by weight based on the dry weight of multistage polymer. In certain embodiments, the multivalent cation is present in an amount of 3 weight % or less, or 1 weight % or less, or 0.3 weight % or less, based on the dry weight of the multistage polymer.

Within the phosphate salt of a multivalent cation, the anion is one or more of orthophosphate, one or more pyrophosphate, one or more metaphosphate, or a mixture thereof. In some embodiments, the anion of the phosphate salt of a multivalent cation is orthophosphate. In some embodiments, no phosphate anion is present other than orthophosphate. In certain embodiments, the phosphate salt of the multivalent cation is water insoluble. In certain embodiments, the multivalent cation is chosen that has the characteristic that the orthophosphate salt of that multivalent cation is water insoluble while the chloride salt of that multivalent cation is water soluble.

The amount of phosphate salt that is present in the composition can be characterized by the weight of elemental phosphorous that is present in the phosphate ions in that salt, expressed as parts per million ("ppm") or as percent, based on the dry weight of the multistage polymer. In certain embodiments, the amount of phosphate salt of a multivalent cation, as characterized by weight of phosphorous based on the dry weight of multistage polymer, is 10 ppm or more, or 30 ppm or more, or 100 ppm or more. In certain embodiments, the amount of phosphate salt of a multivalent cation, as characterized by weight of phosphorous based on the dry weight of multistage polymer, is 3 weight % or less, or 1 weight % or less, or 0.3 weight % or less, or 0.1 weight % or less.

In certain embodiments, most or all of the multivalent cation that is present in the composition is in the form of a water insoluble phosphate salt. In some embodiments, the molar amount of multivalent cation that is present in the form of a water insoluble phosphate salt is 80% or more, or 90% or more, or 95% or more, or 98% or more, or 100%, based on the total moles of multivalent cation present in the composition.

In certain embodiments, most or all of the water that remains with the coagulated polymer is removed from the coagulated polymer by one or more of the following operations: filtration (including, for example, vacuum filtration), and/or centrifugation. In certain embodiments, the coagulated polymer is optionally washed with water one or more times. Coagulated polymer is a complex structure, and it is known that water cannot readily contact every portion of the coagulated polymer. While not wishing to be bound by theory, it is contemplated that a significant amount of multivalent cation and residual phosphate surfactant will be left behind. Accordingly, in certain embodiments, the composition of the present invention will contain phosphate surfactant in an amount of 50 ppm or more, or 100 ppm or more, or 500 ppm or more, based on the dry weight of the multistage polymer. In certain embodiments, the composition of the present invention will contain phosphate surfactant in an amount of 10,000 ppm or less, or 7,500 ppm or less, or 5,000 ppm or less, based on the dry weight of the multistage polymer.

In the process of the present invention, the coagulated multistage polymer is treated with an alkaline phosphate. In certain embodiments, such treatments are carried out prior to the drying step discussed below. In certain embodiments, the alkaline phosphate is in the form of an aqueous solution. Suitable treatments include, for example, spraying the aqueous solution of an alkaline phosphate onto the coagulated multistage polymer, or adding the coagulated multistage polymer into a container holding the aqueous solution of an alkaline phosphate followed by separating the coagulated multistage polymer from the aqueous solution (e.g., by filtration). In such embodiments, the composition of the present invention contains one or more alkaline phosphate. Suitable alkali metals include, for example, sodium, potassium, and mixtures thereof. In certain embodiments, the alkaline phosphate is present, as characterized by weight of phosphorous, in an amount of 100 ppm or more, or 300 ppm or more, based on the dry weight of multistage polymer. In certain embodiments, the alkaline phosphate is present, as characterized by weight of phosphorous, in an amount of 100 ppm or more, or 300 ppm or more, based on the dry weight of the polymer composition. Independently, the alkaline phosphate is present in an amount of 1 weight % or less, or 0.5 weight % or less, or 0.25 weight % or less, or 0.1 weight % or less, based on the dry weight of the polymer composition.

In certain embodiments, the method of treating the coagulated polymer with alkaline phosphate is chosen with the purpose of controlling the amount of phosphate ion that is retained in the dry form of the polymer composition (by drying, for example, in an oven or in a fluid-bed dryer) of the present invention. A polymer composition of the present invention is considered herein to be dry if it contains water in an amount of 1 weight % or less, or 0.5 weight % or less, based on the total weight of the polymer composition. In certain embodiments, the amount of phosphate ion retained in the dry form of the polymer composition of the present invention is in equivalent excess over the multivalent cations present in the polymer composition of the present invention.

In certain embodiments, the polymer composition of the present invention may also include a flow aid. A flow aid is a hard material in the form of a powder (mean particle diameter of 1 micrometer to 1 mm). Suitable flow aids include, for example, hard polymers (i.e., polymers having a $T_g$ of 80° C. or higher) or a mineral (e.g., silica).

In certain embodiments, the polymer composition of the present invention may also include a stabilizer. Suitable stabilizers include, for example, radical scavengers, peroxide decomposers, and metal deactivators. Suitable radical scavengers include, for example, hindered phenols (e.g., those having a tertiary butyl group attached to each carbon atom of the aromatic ring that is adjacent to the carbon atom to which a hydroxyl group is attached), secondary aromatic amines, hindered amines, hydroxylamines, and benzofuranones. Suitable peroxide decomposers include, for example, organic sulfides (e.g., divalent sulfur compounds, e.g., esters of thiodopropionic acid), esters of phosphorous acid ($H_3PO_3$), and hydroxyl amines. Suitable metal deactivators include, for example, chelating agents (e.g., ethylenediaminetetraacetic acid).

As noted above, one aspect of the present invention utilizes the polymer composition described herein as an impact modifier in a matrix resin composition containing the multistage polymer composition and a matrix resin. After the mixture of multistage polymer and matrix resin is mixed and melted and formed into a solid item, the impact resistance of that item will be better than the same solid item made with matrix resin that has not been mixed with multistage polymer. In certain embodiments, the multistage polymer is provided in a solid form, e.g., pellets or powder or a mixture thereof. In certain embodiments, the matrix resin is provided in solid form, e.g., pellets or powder or a mixture thereof. In certain embodiments, solid multistage polymer is mixed with solid matrix resin, either at room temperature (20° C.) or at elevated temperature (e.g., 30° C. to 90° C.). In certain embodiments, solid multistage polymer is mixed with melted matrix resin, e.g., in an extruder or other melt mixer. In certain embodiments, solid multistage polymer is mixed with solid matrix resin, and the mixture of solids is then heated sufficiently to melt the matrix resin, and the mixture is further mixed, e.g., in an extruder or other melt-processing device. In certain embodiments, the weight ratio of the matrix resin to the multistage polymer of the present invention is 1:1 or higher, or 1.1:1 or higher, or 2.3:1 or higher, or 4:1 or higher, or 9:1 or higher, or 19:1 or higher, or 49:1 or higher, or 99:1 or higher.

Suitable matrix resins include, for example, polyolefins, polystyrene, styrene copolymers, poly(vinyl chloride), poly (vinyl acetate), acrylic polymers, polyethers, polyesters, polycarbonates, polyurethanes, and polyamides. In certain embodiments, the matrix resin contains at least one polycarbonate. Suitable polycarbonates include, for example homopolymers of polymerized units derived from Bisphenol A ("BPA"), and also copolymers that include polymerized units of BPA along with one or more other polymerized units. In certain embodiments, the matrix resin contains at least one polyester. Suitable polyesters include, for example, polyethylene terephthalate and polybutylene terephthalate. In certain embodiments, the matrix resin contains a blend of polymers. Suitable blends of polymers include, for example, blends of polycarbonates and styrene resins, and blends of polycarbonates and polyesters. Suitable styrene resins include, for example, polystyrene and copolymers of styrene with other monomers, e.g., acrylonitrile/butadiene/styrene ("ABS") resins.

The matrix resin composition containing multistage polymer and matrix resin may contain one or more additional materials that are added to the mixture. Any one or more of such additional materials may be added to the multistage polymer or to the matrix resin prior to formation of the final mixture of all materials. Each of the additional materials (if any are used) may be added (alone or in combination with each other and/or in combination with multistage polymer) to matrix resin when matrix resin is in solid form or in melt form. Suitable additional materials include, for example, dyes, colorants, pigments, carbon black, fillers, fibers, lubricants (e.g., montan wax), flame retardants (e.g., borates, antimony trioxide, or molybdates), and other impact modifiers that are not multistage polymers of the present invention.

The matrix resin composition may be used to form a useful article, for example by film blowing, profile extrusion, molding, other methods, or a combination thereof. Molding methods include, for example, blow molding, injection molding, compression molding, other molding methods, and combinations thereof.

Some embodiments of the invention will now be described in detail in the following Examples.

EXAMPLES

Example 1

Preparation of Comparative Polymer Composition C1
(Carboxylate Surfactant+Alkaline Phosphate Post-Addition)

A stainless steel autoclave with an agitator and several entry ports was charged 3 parts of Potassium Oleate emulsifier in 7390 parts of deionized water and 9.6 parts of sodium formaldehyde sulfoxylate. The autoclave was evacuated and 5272 parts of butadiene, 183 parts of styrene, 52 parts of cumene hydroperoxide, and 46 parts of divinylbenzene were added and caused to react at 70° C. over a ten hour period. An additional 59 parts of Potassium Oleate emulsifier was also added. At the end of the reaction period no further pressure drop was observed, the reaction pressure was vented.

To 2000 parts of the rubber latex having approximately 40% solids, as prepared above, were added 112 parts of styrene followed by 0.23 parts of sodium formaldehyde sulfoxylate dissolved in 10 parts of deionized water and 0.37 parts of 70% active strength tert-butyl hydroperoxide. One hour after the completion of the exotherm, 115 parts of methylmethacrylate, 1.2 parts of butylene dimethacrylate, 0.58 parts of sodium formaldehyde sulfoxylate dissolved in 24 parts of deionized water and 0.93 parts of 70% active strength tert-butyl hydroperoxide were added and caused to react to completion. The resulting multistage polymer latex had approximately 45% solids.

This latex was treated with a 20% solids emulsion of octadecyl 3-(3,5-ditert-butyl-4-hydroxyphenyl)propanoate (available as IGONOX 1076 from BASF) to deliver 2.9% hindered phenol antioxidant, solids on solids. The latex was then coagulated by adding it over a 1 minute period with good mixing to 8000 grams of 0.10% Hydrochloric Acid coagulant solution at a temperature of 51° C. The slurry thus formed was neutralized using a sodium hydroxide solution until a pH of 5.5 was reached and then was heated to 80° C. for a period of one hour. The slurry was filtered by centrifuge to create a wet cake. The wet cake was washed with water on the centrifuge until the conductivity of the effluent water reached 50 µS/cm. The washed wet cake collected from the centrifuge had a solids level of approximately 35%, labeled herein "IM wet cake." The IM wet cake was sprayed and with a solution containing 1.13 grams of Monosodium Phosphate and 2.30 grams of Disodium Phosphate dissolved in 60 grams of water. The phosphate spray utilized was an aqueous solution mixture comprised of 33% Monosodium Phosphate and 67% Disodium Phosphate by solids weight. The solution was applied as a spray to deliver 750 ppm of phosphorous in the final powder. The sprayed IM wet cake was hand-mixed for a one minute period to achieve a uniform distribution of the Phosphate. The sprayed IM wet cake was then dried by a vacuum oven held at 50° C. for 16 hours to form a powder, herein called "IM powder."

Example 2

Preparation of Comparative Polymer Composition C2
(Phosphate Surfactant+No Alkaline Phosphate Post-Addition)

The latex synthesis method described for Comparative Polymer Composition C1 above was followed, except that Rhodafac® RS-610 from Stepan Company (a surfactant having a $C_{13}H_{27}$ alkyl group connected to 6 ethylene oxide units connected to a phosphate functional endgroup) was utilized as the emulsifier instead of Potassium Oleate. The charges of RS-610 to the polymerization reaction were 7.8 grams initially, followed by an additional 148 grams during the polymerization. This latex was treated with a 20% solids emulsion of octadecyl 3-(3,5-ditert-butyl-4-hydroxyphenyl) propanoate to deliver 2.9% hindered phenol antioxidant, solids on solids. The latex was then coagulated by adding it over a 1 minute period with good mixing to 8000 grams of 0.14% Calcium Chloride coagulant solution at a temperature of 54° C. The slurry thus formed was then was heated to 80 C for a period of one hour. The slurry was filtered by centrifuge to create a wet cake. The wet cake was washed with water on the centrifuge until the conductivity of the effluent water reached 50 µS/cm. The washed wet cake collected from the centrifuge had a solids level of approximately 35%, labeled herein "IM wet cake." The IM wet cake was dried by a vacuum oven held at 50° C. for 16 hours to form a powder, herein called "IM powder."

Example 3

Preparation of Comparative Polymer Composition C3 (Phosphate/Sulfonate Surfactant+No Alkaline Phosphate Post-Addition)

The IM powder of this example was product name M-732 manufactured by Kaneka Corporation. The rubber component is polybutadiene. The product type is core/shell type methacrylate-butadiene-styrene copolymer. The antioxidant octadecyl 3-(3,5-ditert-butyl-4-hydroxyphenyl)propanoate is present at 2.9 weight percent. The emulsifier present is $C_{12}$, $C_{14}$ (& some $C_{16}$) phosphated alcohol ethoxylate (mode at EO 8). Calcium is present at 830 ppm. No soluble (alkaline) Phosphate is present.

Example 4

Preparation of Comparative Polymer Composition C4 (Sulfonate Surfactant+Alkaline Phosphate Post-Addition)

The latex synthesis method described for Comparative Polymer Composition C1 above was followed, except that Polystep® A-18 from Stepan Company was utilized as the emulsifier instead of Potassium Oleate. The charges of (39% active form) A-18 to the polymerization reaction were 9.3 grams initially, followed by an additional 181 grams during the polymerization. This latex was treated with a 20% solids emulsion of octadecyl 3-(3,5-ditert-butyl-4-hydroxyphenyl) propanoate to deliver 2.9% hindered phenol antioxidant, solids on solids. The latex was then coagulated by adding it over a 1 minute period with good mixing to 8000 grams of 0.43% Calcium Chloride coagulant solution at a temperature of 51° C. The slurry was then heated to 80° C. for a period of one hour. The slurry was filtered by centrifuge to create a wet cake. The wetcake was washed with water on the centrifuge until the conductivity of the effluent water reached 50 µS/cm. The washed wet cake collected from the centrifuge had a solids level of approximately 35%, labeled herein "IM wet cake." The IM wet cake was sprayed and with a solution containing 1.13 grams of Monosodium Phosphate and 2.30 grams of Disodium Phosphate dissolved in 60 grams of water. The sprayed IM wet cake was hand-mixed for a one minute period to achieve a uniform distribution of the Phosphate. The sprayed IM wet cake was dried by a vacuum oven held at 50° C. for 16 hours to form a powder, herein called "IM powder."

Example 5

Preparation of Inventive Polymer Composition E1 (Phosphate Surfactant+Alkaline Phosphate Post-Addition)

The latex synthesis method described in Comparative Polymer Composition C1 was followed, except that Rhodafac® RS-610 from Stepan Company was utilized as the emulsifier instead of Potassium Oleate. The charges of RS-610 to the polymerization reaction were 7.8 grams initially, followed by an additional 148 grams during the polymerization.

This latex was treated with a 20% solids emulsion of octadecyl 3-(3,5-ditert-butyl-4-hydroxyphenyl)propanoate to deliver 2.9% hindered phenol antioxidant, solids on solids. The latex was then coagulated by adding it over a 1 minute period with good mixing to 8000 grams of 0.14% Calcium Chloride coagulant solution at a temperature of 54° C. The slurry thus formed was then was heated to 80° C. for a period of one hour. The slurry was filtered by centrifuge to create a wet cake. The wet cake was washed with water on the centrifuge until the conductivity of the effluent water reached 50 µS/cm. The washed wet cake collected from the centrifuge had a solids level of approximately 35%, labeled herein "IM wet cake." The IM wet cake was sprayed and with a solution containing 1.13 grams of Monosodium Phosphate and 2.30 grams of Disodium Phosphate dissolved in 60 grams of water. The sprayed IM wet cake was hand-mixed for a one minute period to achieve a uniform distribution of the Phosphate. The sprayed IM wet cake was dried by a vacuum oven held at 50° C. for 16 hours to form a powder, herein called "IM powder."

Example 6

Stability Study of Matrix Resin Compositions Including Comparative and Inventive Polymer The stability of comparative matrix resin compositions containing Comparative Polymer Compositions C1-C4 was compared with inventive matrix compositions containing Inventive Polymer Composition E1. The study evaluated the matrix resin compositions for both melt flow rate ("MFR") and yellowness index ("YI") after storage at specified humidity for specified times.

The powder IM samples were blended with Lexan® 141-112 Polycarbonate resin obtained from SABIC Industries. The blend contained 5% by weight of the powder IM. The blend was compounded in a 30 mm Werner Pfleider extruder with the final zones held at 290° C. The extruded strands were fed through a water bath and then chopped to produce pellets. The pellets were injection molded using a nozzle temperature of 290° C. to form 2×3×⅛ inch flat bars for color testing. The pellets and the bars were placed into a chamber controlled at 90° C. and 95% Relative Humidity. At periodic times, samples of the pellets and bars were removed for testing.

For the Melt Flow Rate ("MFR") testing, pellets were utilized. The pellets used for MFR were re-dried at 80° C./27 in Hg for 23.5 hrs. The MFR was done using ASTM D1238-04C, using a 1.2 kg weight and temperature of 300° C. The results are recorded as gm/10 min.

For the Yellowness Index ("YI") testing, a Hunter Labs LabScan XE Spectrophotometer instrument was utilized, using an area view of 0.25 inches, using an illuminating and viewing geometry of 0/45, and a port size of 0.40 inches. These conditions follow the guidelines of ASTM E1349.

The results of the MFR testing and YI testing are shown in Table 1.

TABLE 1

| | MFR and Y1 Evaluation of Matrix Resin Compositions | | | | |
|---|---|---|---|---|---|
| Sample | MFR at 0 hrs | MFR at 330 hr 90° C./95% RH | MFR at 500 hr 90 C./95% RH | ΔYI % at 500 hr 90° C./95% RH | ΔYI % at 1176 hr 90° C./95% RH |
| C1 | 10.2 | 18.6 | 24.3 | 26.1 | 46.4 |
| C2 | 8.8 | 21.9 | 33.5 | 28.1 | 51.2 |
| C3 | 9.0 | 16.0 | 23.8 | 28.0 | 53.7 |
| C4 | 9.0 | 25.7 | 38.7 | 30.3 | 57.6 |
| E1 | 9.4 | 15.3 | 20.0 | 17.6 | 36.1 |

The test results show that the matrix resin compositions in accordance with the present invention, i.e., those prepared using Inventive Polymer Composition 1, surprisingly causes the least amount of Polycarbonate compound degradation under hot and humid conditions. The least amount of Polycarbonate degradation is demonstrated by the lowest value for Melt Flow Rate which correlates directly with the molecular weight which correlates directly with the degree of chain cleavage by hydrolysis. The least amount of yellow color generation (i.e., Yellowness Index) demonstrates the highest level of chemical stability of the polybutadiene portion of the compound.

What is claimed is:

1. A process for making a polymer composition comprising:
   (i) providing a multistage polymer latex by emulsion polymerization in the presence of a phosphate surfactant, wherein the multistage polymer comprises
      (a) a first stage polymer having a $T_g$ of −20° C. or lower, and
      (b) a final stage polymer having a $T_g$ of 50° C. or higher;
   (ii) coagulating the multistage polymer latex with one or more water-soluble salt of a multivalent cation;
   (iii) treating the coagulated multistage polymer with an alkaline phosphate;
   (iv) drying the coagulated multistage polymer to a water content of less than 1 weight % based on the dry weight of the multistage polymer,
   wherein the weight of the dried multistage polymer comprises 100 ppm or more, based on the dry weight of the multistage polymer, of phosphorous that is in the form of an alkaline phosphate.

2. The process of claim 1, wherein
   the first stage polymer comprises polymerized units derived from one or more units selected from the group consisting of ethyl hexyl acrylate, butyl acrylate, butadiene, isoprene, styrene, alpha-methyl styrene, acrylic acid, and methacrylic acid, and
   the final stage polymer comprises polymerized units derived from one or more units selected from the group consisting of styrene, alpha-methyl styrene, methyl methacrylate, and butyl acrylate.

3. The process of claim 1, wherein the first stage polymer is present in an amount of from 10 to 98 weight %, based on the total weight of the multistage polymer, and the final stage polymer is present in an amount of from 2 to 50 weight %, based on the total weight of the multistage polymer.

4. The process of claim 1, wherein the step (ii) of coagulating the multistage polymer comprises mixing the multistage polymer latex with one or more water-soluble salt of a multivalent cation.

5. The process of claim 4, wherein the multivalent cation is water insoluble.

6. The process of claim 1, further comprising (iia) washing the multistage polymer with water.

7. The process of claim 1, wherein the phosphate surfactant comprises one or more phosphate surfactant selected from the group consisting of polyoxyalkylene alkyl phenyl ether phosphate salt, polyoxyalkylene alkyl ether phosphate salt, polyoxyethylene alkyl phenyl ether phosphate salt, and polyoxyethylene alkyl ether phosphate salt.

8. The process of claim 1, wherein the emulsion polymerization is carried out in the presence of a phosphate surfactant that is present in an amount of from 0.5 to 5 weight %, as characterized by weight of phosphate surfactant based on the total monomer weight added to the polymerization.

9. A process for making a matrix composition comprising mixing one or more matrix resins and the polymer composition of claim 1.

10. The process of claim 9, wherein the matrix resin is selected from the group consisting of one or more polycarbonate, one or more polycarbonate blended with one or more polyester, and one or more polycarbonate blended with one or more ABS resin.

* * * * *